(12) United States Patent
Kim et al.

(10) Patent No.: US 10,019,464 B2
(45) Date of Patent: Jul. 10, 2018

(54) APPARATUS AND METHOD FOR SEARCHING FOR IMAGE

(71) Applicant: Samsung Electronics Co., Ltd., Gyeonggi-do (KR)

(72) Inventors: Won-Ki Kim, Gyeonggi-do (KR); Moo-Hyun Kim, Gyeonggi-do (KR); Yeong-Woong Park, Seoul (KR); Bo-Hyun Song, Seoul (KR); Jung-Jun Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/820,117

(22) Filed: Aug. 6, 2015

(65) Prior Publication Data

US 2016/0042527 A1    Feb. 11, 2016

(30) Foreign Application Priority Data

Aug. 6, 2014    (KR) .................. 10-2014-0101260

(51) Int. Cl.
*G06K 9/46* (2006.01)
*G06F 17/30* (2006.01)
*G06K 9/20* (2006.01)

(52) U.S. Cl.
CPC .. *G06F 17/30268* (2013.01); *G06F 17/30259* (2013.01); *G06K 9/2081* (2013.01); *G06K 9/4609* (2013.01)

(58) Field of Classification Search
CPC ...... G06K 9/4609; G06K 9/40; G06K 9/2081; G06F 17/30259; G06F 17/30268
USPC ........................ 382/218, 305, 209
See application file for complete search history.

(56) References Cited

U.S. PATENT DOCUMENTS

| | | | |
|---|---|---|---|
| 6,922,488 B2* | 7/2005 | Mastrianni | G06Q 20/3674 382/199 |
| 8,024,775 B2* | 9/2011 | Xu | G06F 21/36 713/182 |
| 2010/0049629 A1* | 2/2010 | Rathod | G06F 17/30277 705/26.1 |
| 2012/0072410 A1 | 3/2012 | Wang et al. | |

(Continued)

FOREIGN PATENT DOCUMENTS

| JP | 201170633 | 4/2011 |
|---|---|---|
| KR | 1020130059033 | 6/2013 |

OTHER PUBLICATIONS

Bhute, et al. (Content Based Image Indexing and Retrieval), International Journal of Graphics & Image Processing, pp. 235-246, Nov. 2013.*

(Continued)

*Primary Examiner* — Daniel Mariam
(74) *Attorney, Agent, or Firm* — The Farrell Law Firm, P.C.

(57) ABSTRACT

An apparatus and a method for searching for an image are provided. The apparatus includes an image receiver configured to receive an image to be searched for; an image processor configured to detect an edge of the received image and to filter pixels included on the edge of the received image based on parameters related to gradients of the edge of the received image; and an image search unit configured to search for one or more images related to the image to be searched for based on the filtered pixels included on the edge of the received image.

16 Claims, 9 Drawing Sheets

(56) References Cited

U.S. PATENT DOCUMENTS

2013/0251266 A1    9/2013  Nakagome et al.

OTHER PUBLICATIONS

Baker (Object Detection Using Contrast Enhancement and Dynamic Noise Reduction), UNLV, pp. 13-31, Dec. 2013.*
Asha, et al. (A Survey on Content Based Image Retrieval Based on Edge Detection), International Journal of Computer Science and Information Technologies, pp. 1-4.*
Sarkar, et al. "A Shape Based Image Search Technique", pp. 78-82, International Journal of Advanced Computer Science and Applications 5.7 (Jul. 2014).*
Martin, David et al., A Database of Human Segmented Natural Images and its Application to Evaluating Segmentation Algorithms and Measuring Ecological Statistics, ICCV Vancouver, Jul. 2001, pp. 8.
Arbelaez, Pablo et al., Contour Detection and Hierarchical Image Segmentation, Technical Report No. UCB/EECS-2010-17, Feb. 16, 2010, pp. 22.

* cited by examiner

APPARATUS AND METHOD FOR SEARCHING FOR IMAGE

PRIORITY

This application claims priority under 35 U.S.C. § 119(a) to Korean Application Serial No. 10-2014-0101260, which was filed in the Korean Intellectual Property Office on Aug. 6, 2014, the entire content of which is incorporated herein by reference.

BACKGROUND

1. Field of the Invention

The present invention generally relates to an image searching apparatus and method capable of allowing a user to intuitively search for a desired image.

2. Description of the Related Art

For users of electronic devices such as smart phones, a function of rapidly searching for information on an image which a user desires to find (hereinafter, referred to as an "image to be searched for") is recognized as an important function by users. Accordingly, the users are highly interested in a technology that searches for an edge of an object included in the image and determines what shape is included in the image.

Conventionally, in a method of searching for an image, when a user desires to search for an image, the user inputs a keyword about the image which the user desires to search for or the user accesses a particular webpage to search for an image which the user desires to search for.

Further, in conventional methods, determining a shape of the image input by the user is without separately filtering the edge of the image input into an electronic device when the shape of the image is determined.

Conventionally, the user acquires a desired image only through a keyword search or webpage access, and accordingly, it takes lots of time to acquire information related to the image which the user desires. That is, the conventional methods do not allow the user to intuitively search for a desired image.

Further, although a shape of the input image can be determined by some pixels which represent a characteristic shape of the image, data on many unnecessary pixels is also used to determine the shape of the input image. Accordingly, an increase in data throughput of a processor and unnecessary occupancy of memory capacity are generated.

SUMMARY

The present invention has been made to solve at least the above problems and/or disadvantages and to provide at least the advantages described below. Accordingly, an aspect of the present invention is to provide an image searching apparatus and method for improving user convenience in an image search by allowing a user to intuitively search for information (for example, information on an object having a shape similar to an image to be searched for) related to the image to be searched for, such as a sketch image (for example, an image input into the electronic device through a stylus pen) or a scan image (for example, an image scanned by a scanner) input by the user.

Another aspect of the present invention is to provide an image search apparatus and method for reducing data throughput and occupancy of memory capacity generated when an image shape is determined by a predetermined operation with only some filtered pixels among pixels included in on an edge of the image to be searched for.

In accordance with an aspect of the present invention, an apparatus for searching for an image is provided. The apparatus includes an image receiver configured to receive an image to be searched for; an image processor configured to detect an edge of the received image and to filter pixels included on the edge of the received image based on parameters related to gradients of the edge of the received image; and an image search unit configured to search for one or more images related to the image to be searched for based on the filtered pixels included on the edge of the received image.

In accordance with another aspect of the present invention, a method of searching for an image is provided. The method includes receiving an image to be searched for; detecting an edge of the received image and filtering pixels included on the edge of the received image based on parameters related to gradients of the edge of the received image; and searching for one or more images related to the image to be searched for based on the filtered pixels included on the edge of the received image.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
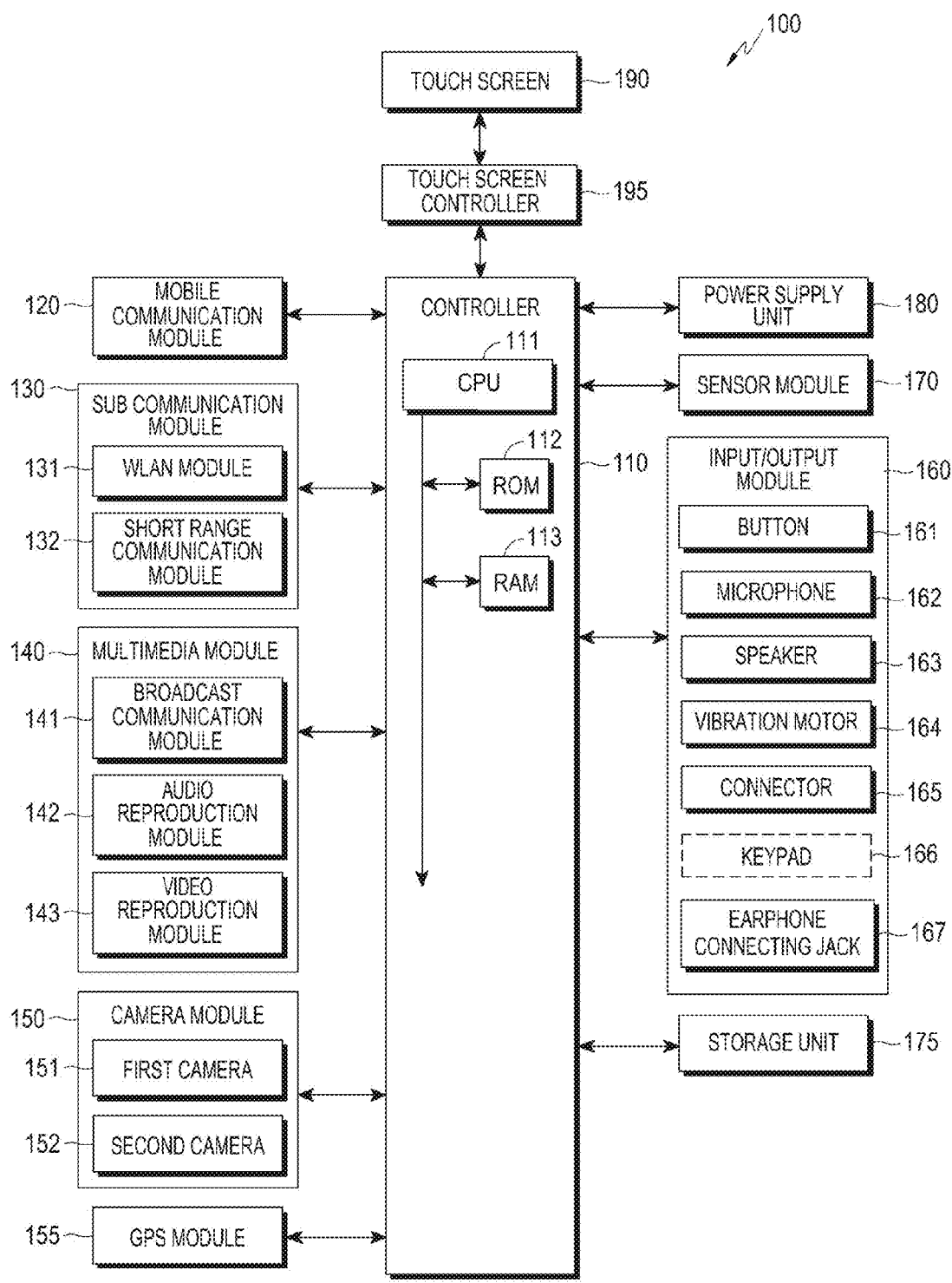
FIG. 1 is a block diagram schematically illustrating a configuration of an electronic device according to an embodiment of the present invention.

Embodiments of the present invention will now be described more fully with reference to the accompanying drawings in which particular embodiments are shown, but the present invention may include various changes and modifications, and have various embodiments. However, the embodiments do not limit the present invention to a specific implementation, but should be construed as including all modifications, equivalents, and replacements included in the spirit and scope of the present invention.

Although the terms including an ordinal number such as first, second, etc. can be used for describing various elements, the structural elements are not restricted by the terms. The terms are only used to distinguish one element from another element. For example, without departing from the scope of the present invention, a first structural element may be referred to as a second structural element. Similarly, the second structural element also may be referred to as the first structural element. As used herein, the terms "and/or" include any and all combinations of one or more associated items.

The terms used in this disclosure are for the purpose of describing particular embodiments only and are not intended to limit the present invention. As used herein, the singular forms are intended to include the plural forms as well, unless the context clearly indicates otherwise. In this description, it should be understood that the terms "include" or "have" indicate existence of a feature, a number, a step, an operation, a structural element, parts, or a combination thereof, and do not exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. It should be interpreted that the terms, which are identical to those defined in general dictionaries, have the same meanings as in the context of related techniques. The terms should not be ideally or excessively interpreted.

An electronic device according to an embodiment of the present invention may be a device with a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches. However, the specification describes a smart phone as an example of an electronic device 100 for convenience of the description, but it is obvious to those skilled in the art that embodiments of the present invention are not limited thereby.

Referring to FIG. 1, the electronic device 100 may be connected to an external device by using an external device connector such as a sub-communication module 130, a connector 165, and an earphone connecting jack 167. The external device includes various devices that can be attached to or detached from the electronic device 100 through a cable, such as earphones, an external speaker, a Universal Serial Bus (USB) memory, a charger, a cradle, a docking station, a Digital Multimedia Broadcasting (DMB) antenna, a mobile payment related device, a health management device (blood sugar tester or the like), a game machine, a car navigation device and the like. Further, the external device may include one of a short-range communication unit such as a Bluetooth communication unit, a Near Field Communication (NFC) unit and a Wi-Fi direct communication device, and a wireless Access Point (AP), which are wirelessly connected to the electronic device 100 via short-range communication. Furthermore, the external device may include other devices, such as a mobile phone, a smart phone, a tablet PC, a desktop PC, and a server.

Referring to FIG. 1, the electronic device 100 includes a display unit 190 and a display controller 195. Hereinafter, descriptions will be made in which the display unit 190 and the display controller 195 are a touch screen 190 and a touch screen controller 195, respectively, by way of example. Also, the electronic device 100 includes a controller 110, a mobile communication module 120, a sub-communication module 130, a multimedia module 140, a camera module 150, a GPS module 155, an input/output module 160, a sensor module 170, a storage unit 175, and a power supply unit 180. The sub-communication module 130 includes at least one of a Wireless Local Area Network (WLAN) module 131 and a short range communication module 132, and the multimedia module 140 includes at least one of a broadcasting communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, a connector 165, a keypad 166, and an earphone connecting jack 167.

The controller 110 may include a Central Processing Unit (CPU) 111, a Read Only Memory (ROM) 112 storing a control program for controlling the electronic device 100, and a Random Access Memory (RAM) 113 used as a storage area for storing a signal or data input from the outside of the electronic device 100 or for work performed in the electronic device 100. The CPU 111 may include a single core, a dual core, a triple core, or a quadruple core. The CPU 111, the ROM 112 and the RAM 113 may be connected with each other through internal buses.

The controller 110 controls the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 connects the electronic device 100 with an external device through mobile communication by using one or more antennas under a control of the controller 110. The mobile communication module 120 transmits/receives a radio signal for a voice call, a video call, a Short Message Service (SMS), or a Multimedia Message Service (MMS) to/from a mobile phone, a smart phone, a tablet PC, or another device having a phone number input into the electronic device 100.

The sub-communication module 130 may include at least one of the WLAN module 131 and the short range communication module 132. For example, the sub-communication module 130 may include only the WLAN module 131, only the short-range communication module 132, or both the WLAN module 131 and the short-range communication module 132.

The WLAN module 131 may be connected to the Internet in a place where a wireless Access Point (AP) is installed, under a control of the controller 110. The WLAN module 131 supports a wireless Local Area Network (LAN) standard (IEEE802.11x) of the Institute of Electrical and Electronics Engineers (IEEE). The short-range communication module 132 may wirelessly perform short-range communication between the electronic device 100 and an image forming device under a control of the controller 110. The short-range communication scheme may include a Bluetooth communication scheme, an Infrared Data Association (IrDA) scheme, a Wi-Fi Direct communication scheme, a Near Field Communication (NFC) scheme, and the like.

The electronic device 100 may include at least one of the mobile communication module 120, the WLAN module 131, and the short-range communication module 132 according to a performance thereof. For example, the electronic device 100 may include a combination of the mobile communication module 120, the WLAN module 131, and the short-range communication module 132 according to a performance of the electronic device 100.

The multimedia module 140 may include the broadcasting communication module 141, the audio reproduction module 142 or the video reproduction module 143. The broadcasting communication module 141 receives a broadcasting signal, for example, a TV broadcasting signal, a radio broadcasting signal, or a data broadcasting signal, and broadcasting supplement information, for example, Electric Program Guide (EPG) or Electric Service Guide (ESG), output from a broadcasting station through a broadcast and communication antenna under a control of the controller 110. The audio reproduction module 142 reproduces a stored or received digital audio file, for example, a file having a file extension of mp3, wma, ogg, or wav, under a control of the controller 110. The video reproduction module 143 reproduces a digital video file (for example, a file having a file extension of mpeg, mpg, mp4, avi, mov, or mkv) stored or received, under a control of the controller 110. The video reproduction module 143 may also reproduce a digital audio file.

The multimedia module 140 may include the audio reproduction module 142 and the video reproduction module 143 except for the broadcasting communication module 141. Further, the audio reproduction module 142 or the video reproduction module 143 of the multimedia module 140 may be included in the controller 110.

The camera module 150 may include at least one of the first camera 151 and the second camera 152 which photograph a still image or a moving image under the control of the controller 110. Further, the first camera 151 or the second camera 152 may include an auxiliary light source (for example, a flash (not shown)) that provides an amount of light required for photography. The first camera 151 may be disposed on a front surface of the electronic device 100, and the second camera 152 may be disposed on a rear surface of the electronic device 100. Alternatively, the first camera 151 and the second camera 152 are closely located to each other and photograph a three dimensional still image or a three dimensional video.

The GPS module 155 receives radio waves from a plurality of GPS satellites in Earth's orbit and calculates a position of the electronic device 100 by using Time of Arrival from the GPS satellites to the electronic device 100.

The input/output module 160 may include at least one of a plurality of buttons 161, a microphone 162, a speaker 163, a vibration motor 164, a connector 165, and a keypad 166.

The button 161 may be formed on a front surface, a side surface, or a back surface of a housing of the electronic device 100, and may include at least one of a power/lock button, a volume button, a menu button, a home button, a back button, and a search button.

The microphone 162 receives a voice or a sound to generate an electrical signal under the control of the controller 110.

The speaker 163 outputs sounds corresponding to various signals (for example, a wireless signal, a broadcasting signal, a digital audio file, a digital video file, photographing or the like) of the mobile communication module 120, the sub-communication module 130, the multimedia module 140, or the camera module 150 to the outside of the electronic device 100 under a control of the controller 110. The speaker 163 may output a sound, for example, a button operation sound or a ringtone corresponding to a voice call, corresponding to a function performed by the electronic device 100. One or more speakers 163 may be formed at a suitable position or positions of the housing of the electronic device 100.

The vibration motor 164 converts electrical signals into mechanical vibrations under a control of the controller 110. For example, when the electronic device 100 in a vibration mode receives a voice call from another device, the vibration motor 164 operates. One or more vibration motors 164 may be formed within the housing of the electronic device 100. The vibration motor 164 may operate in response to a touch operation of a user who touches the touch screen 190, and a continuous movement of a touch on the touch screen 190.

The connector 165 is used as an interface for connecting the electronic device 100 with an external device or a power source. The electronic device 100 may transmit or receive data stored in the storage unit 175 of the electronic device 100 to or from an external device through a wired cable connected to the connector 165 according to a control of the controller 110. At this time, the external device may be a docking station, and the data may be an input signal transmitted from an external input device, for example, a mouse, a keyboard or the like. The electronic device 100 is supplied with electric power from the electric power source through a wired cable connected to the connector 165, or is capable of charging a battery by using the electric power source.

The keypad 166 may receive a key input from a user for a control of the electronic device 100. The keypad 166 may include a physical keypad formed in the electronic device 100 or a virtual keypad displayed on the touch screen 190. The physical keypad formed in the electronic device 100 may be excluded according to the performance or a structure of the electronic device 100.

Earphones may be inserted into the earphone connecting jack 167 to be connected with the electronic device 100.

The sensor module 170 includes at least one sensor for detecting a state of the electronic device 100. For example, the sensor module 170 may include a proximity sensor for detecting proximity of a user to the electronic device 100, and an illumination sensor for detecting the amount of light near the electronic device 100. Also, the sensor module 170 may include a gyro sensor. The gyro sensor may detect the movement of the electronic device 100 (for example, rotation of the electronic device 100, or acceleration or vibration applied to the electronic device 100), may detect a point of the compass using the magnetic field of the Earth, or may detect the direction of gravity. Further, the sensor module 170 may include an altimeter for measuring an atmospheric pressure to detect altitude. At least one of the sensors detects the state, generates a signal corresponding to the detection, and transmits the generated signal to the controller 110. At least one of the sensors of the sensor module 170 may be added or omitted according to the capability of the electronic device 100.

The storage unit 175 stores signals or data which are input/output in accordance with operations of the mobile communication module 120, the sub-communication module 130, the multimedia module 140, the camera module 150, the GPS module 155, the input/output module 160, the sensor module 170, and the touch screen 190 under the control of the controller 110. The storage unit 175 stores a control program and applications for control of the electronic device 100 or the controller 110.

The term "storage unit" may refer to the storage unit 175, the ROM 112 in the controller 110, the RAM 113, or a memory card, i.e. a Secure Digital (SD) card and a memory stick inserted in the electronic device 100. The term "storage unit" may further include a non-volatile memory, a volatile memory, a Hard Disk Drive (HDD), and a Solid State Drive (SSD).

The power supply unit 180 supplies power to one or more batteries disposed in the housing of the electronic device 100 under a control of the controller 110. The one or more batteries supply power to the electronic device 100. Further, the power supply unit 180 may supply the electronic device 100 with power input from an external power source through the wired cable connected to the connector 165. In addition, the power supply unit 180 may supply the electronic device 100 with power wirelessly input from the external power source by using a wireless charging technology.

The touch screen 190 provides a user with a User Interface (UI) corresponding to various services (for example, a voice call, data transmission, broadcasting, and photographing). The touch screen 190 may transmit an analog signal corresponding to at least one touch, which is input to the UI, to the touch screen controller 195. The touch screen 190 may receive at least one touch through a user's body part (for example, fingers including a thumb) or a touchable input means (for example, a stylus pen). Further, the touch screen 190 may receive successive movements of the at least one touch. The touch screen 190 may transmit an analog signal corresponding to a continuous movement of an input touch to the touch screen controller 195.

In the present invention, the touch is not limited to a contact between the touch screen 190 and the user's body or a touchable input means, and may include a non-contact or hovering input. An interval which can be detected between the touch screen 190 and the input means may be changed according to the performance or the structure of the electronic device 100.

The touch screen 190, for example, may be implemented in a resistive type, a capacitive type, an infrared type, or an acoustic wave type.

The touch screen controller 195 converts the analog signal received from the touch screen 190 to a digital signal (for example, represented by X and Y coordinates) and transmits the digital signal to the controller 110. The controller 110 may control the touch screen 190 by using the digital signal received from the touch screen controller 195. For example, the controller 110 allows a short-cut icon, which is displayed on the touch screen 190, to be selected, or executes the short-cut icon, in response to a touch on the touch screen 190. Further, the touch screen controller 195 may be included in the controller 110.

Figure 2:
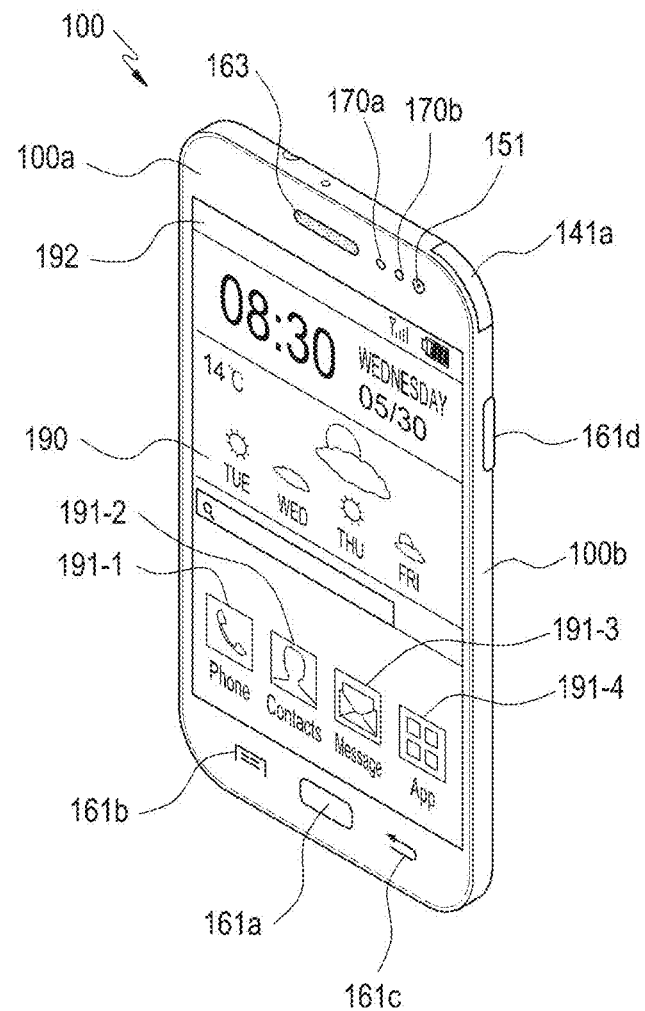
FIG. 2 is a front perspective view of an electronic device according to an embodiment of the present invention.
Figure 3:
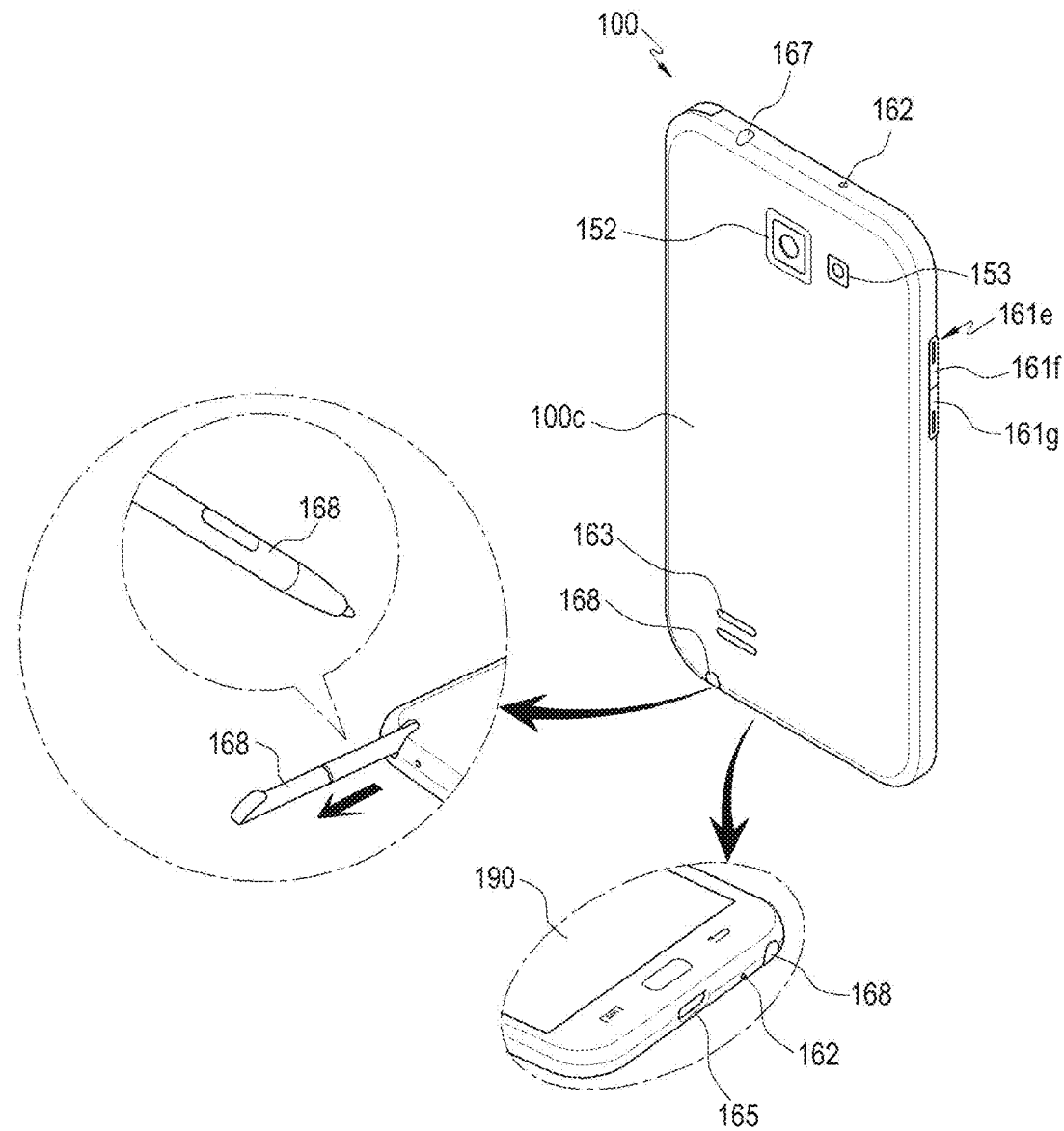
FIG. 3 is a rear perspective view of an electronic device according to the embodiment of the present invention.

FIG. 2 is a front perspective view of a portable device according to an embodiment of the present invention. FIG. 3 is a rear perspective view of a portable device according to an embodiment of the present invention.

Referring to FIG. 2, the touch screen 190 is arranged at the center of the front surface 100a of the electronic device 100. The touch screen 190 covers most of the area of the front side 100a of the electronic device 100. FIG. 2 shows an example in which a main home screen is displayed on the touch screen 190. The main home screen is the first screen displayed on the touch screen 190 when the electronic device 100 is turned on. When the electronic device 100 includes a plurality of pages of different home screens, the main home screen may be the first home screen among the plurality of pages of home screens. Short-cut icons 191-1, 191-2, and 191-3 for executing frequently used applications (for example, phone, contacts, message, and the like), a main menu switching key 191-4 (for example, for switching applications), time, weather and the like may be displayed on the home screen. The application switch key 191-4 displays application icons that indicate applications on the touch screen 190, on a screen. At the top end of the touch screen 190, a status bar 192 may be formed to indicate the status of the electronic device 100 such as the battery charge status, the intensity of a received signal and current time.

A home button 161a, a menu button 161b, and a back button 161c may be formed at a lower portion of the touch screen 190.

The home button 161a provides display of the main home screen on the touch screen 190. For example, when the home button 161a is pressed (or touched) when any home screen different from the main home screen or a menu screen is displayed on the touch screen 190, the main home screen may be displayed on the touch screen 190. In addition, when the home button 161a is pressed (or touched) while an application is being executed on the touch screen 190, the main home screen illustrated in FIG. 2 may be displayed on the touch screen 190. Furthermore, the home button 161a may be used to display recently used applications or a task manager on the touch screen 190.

The menu button 161b provides a connection menu which can be used on the touch screen 190. The connection menu may include a widget addition menu, a background changing menu, a search menu, an editing menu, an environment setting menu, and the like. When an application is executed, the menu button 161b may provide a connection menu connected to the application.

The back button 161c provides display of a screen which was executed just before the currently executed screen or provides termination of a most recently used application.

The first camera 151, an illumination sensor 170a, a proximity sensor 170b, and a speaker 163 may be disposed on an edge of the front surface 100a of the electronic device 100. The second camera 152, a flash 153, and the speaker 163 may be disposed on a rear surface 100c of the electronic device 100.

On side surfaces 100b of the electronic device 100, for example, a power/reset button 161d, a volume button 161e (for example, including a volume-up button 161f and a volume-down button 161g), a terrestrial DMB antenna 141a that receives a broadcast, and one or more microphones 162 may be arranged. The DMB antenna 141a may be formed to be fixed or detachable from the electronic device 100.

Further, the connector 165 is formed on the lower side surface of the electronic device 100. A plurality of electrodes is formed in the connector 165, and the connector 165 may be wiredly connected to an external device. The earphone connecting jack 167 may be formed on the upper side surface of the electronic device 100. Earphones may be inserted into the earphone connecting jack 167.

A stylus pen 168 may be detachably inserted into the electronic device 100 from the lower side surface of the electronic device 100.

Figure 4:
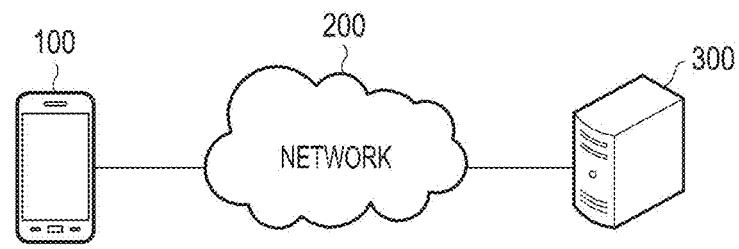
FIG. 4 schematically illustrates a network system in which an electronic device including an image searching apparatus according to an embodiment of the present invention is connected to a server through a network.

FIG. 4 schematically illustrates a network system in which an electronic device including an image searching apparatus according to an embodiment of the present invention is connected to a server through a network.

Figure 5:
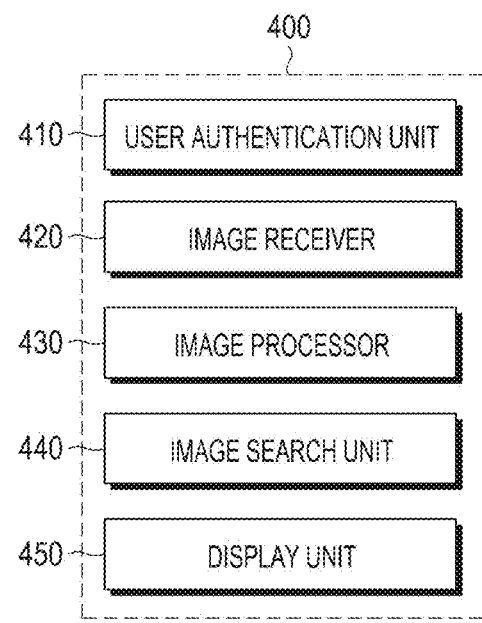
FIG. 5 is a block diagram of a configuration of an image searching apparatus according to an embodiment of the present invention.

Referring to FIG. 4, the electronic device 100 according to an embodiment of the present invention may include an image searching apparatus 400 illustrated in FIG. 5. The electronic device 100 according to an embodiment of the present invention may be connected to a server 300 through a network 200 to perform wireless or wired communication. The wireless communication may include at least one of, for example, Wi-Fi, Bluetooth (BT), NFC, GPS and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like). The wired communication may include at least one of, for example, a Universal Serial Bus (USB), a High Definition Multimedia Interface (HDMI), Recommended Standard 232 (RS-232), and a Plain Old Telephone Service (POTS).

The server 300 according to an embodiment of the present invention may store data on various search images. The electronic device 300 may search for one or more search images stored in the server 300 based on a predetermined filtering operation and an edge of a quantized image to be searched for. Although FIG. 4 illustrates only one server 300 as an embodiment of the present invention, the present invention is not limited thereto. The electronic device 300 may be connected to a plurality of servers through the network 200. Further, as described below, in some embodiments of the present invention, the server 300 may receive a user authentication request from the electronic device 100 and perform a user authentication. However, in some embodiment of the present invention, the electronic device 100 according to an embodiment of the present invention may be directly connected to another electronic device through a Peer-to-Peer (P2P) scheme. That is, the electronic device 300 is connected to another electronic device through the network 200 to perform communication without passing through the server. According to various embodiments of the present invention, the image searching apparatus 400 according to an embodiment of the present invention may search for a search image stored in another electronic device connected through the P2P scheme, or may search for search images stored in the storage unit 175 of the electronic device 300 without being connected to another electronic device (for example, the server 300 or another electronic device) through the network 200.

FIG. 5 is a block diagram of the image searching apparatus according to an embodiment of the present invention.

Referring to FIG. 5, the image searching apparatus 400 according to an embodiment of the present invention may include a user authentication unit 410, an image receiver 420, an image processor 430, and an image search unit 440. The image searching apparatus 400 may further include a display unit 450.

When the user searches for an image through the image searching apparatus 400 according to an embodiment of the present invention, the user authentication unit 410 may perform user authentication to determine whether the user is an authorized user. The user authentication may be performed based on user authentication information. The user authentication information may include, for example, a user IDentification (ID) and a password. The electronic device 100 may transmit a user authentication request to the server 300, receive a response to the user authentication request from the server 300, and determine whether the user is an authorized user which can use an image search server. However, in some embodiments of the present invention, a user authentication process may be omitted. That is, in some embodiments, the user authentication unit 410 illustrated in FIG. 5 may be omitted.

Figure 12:
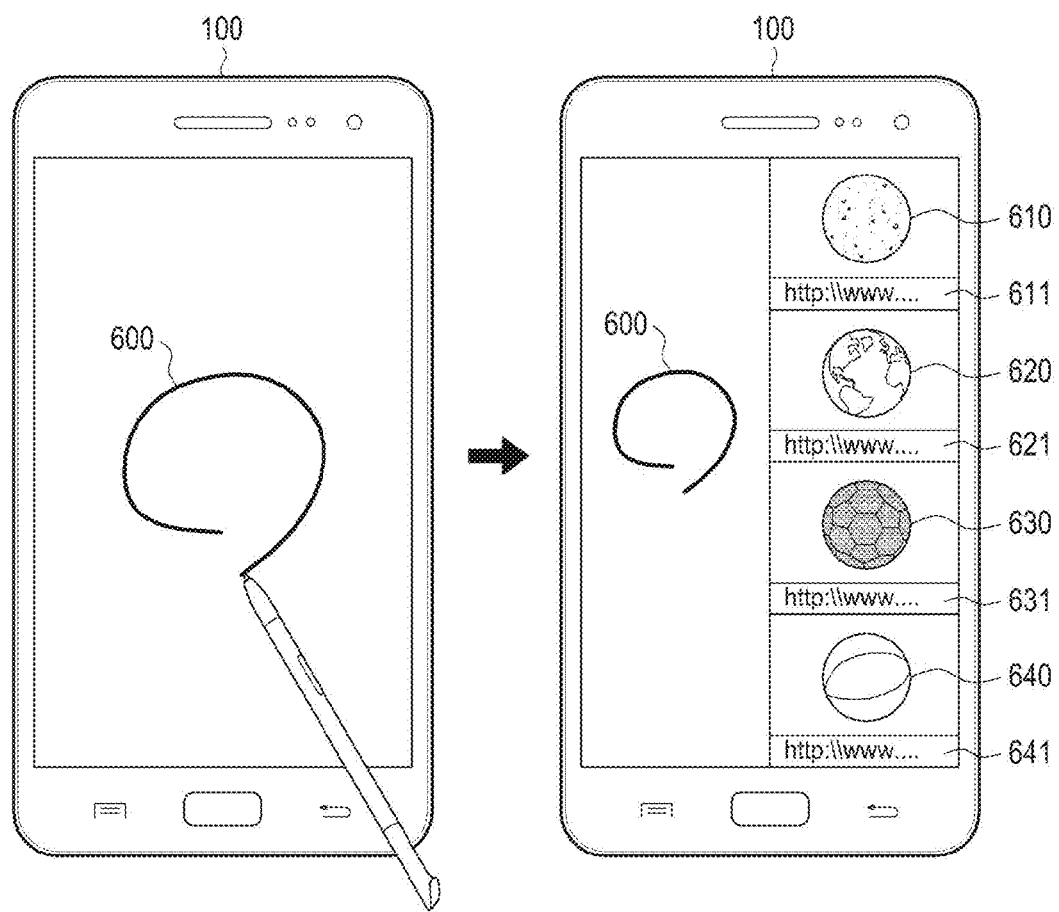
FIG. 12 illustrates an example in which an image searching method according to an embodiment of the present invention is performed by an electronic device.

The image receiver 420 receives the image to be searched for from the user. The image may be received through an input of the image to be searched for from the user. Further, function(s) or operation(s) of the image receiver 420 may be performed, for example, by the touch screen 190. When the function of the image receiver 420 is performed by the touch screen 190, the image to be searched for (for example, a sketch image) may be received in a drawing type on the touch screen 190 by the user using a stylus pen as illustrated in FIG. 12. However, the image to be searched for is not limited thereto.

In some embodiments of the present invention, the image to be searched for according to an embodiment of the present invention may include various still images. For example, the still image may include a picture image photographed by a camera module, a capture image of the screen displayed on the touch screen 190 (a screenshot image), a still image of video contents at a particular time point, and an image scanned by a scanner.

When various objects are included in the still image (for example, when a plurality of objects are photographed and included in a picture image), an image selected by the user from the various objects may be determined as the image to be searched for. In a method of selecting an image to be searched for by the user, the user may select the image to be searched for by drawing an edge of the object to be selected as the image to be searched for using, for example, a stylus pen.

Hereinafter, the image to be searched for is described as the sketch image 600 as illustrated in FIG. 12, and the images 610, 620, 630, and 640 as illustrated in FIG. 12 are the search result of the image 600.

The image processor 430 may detect or determine a shape of the edge of the image 600 to be searched for in order to search the images 610, 620, 630, and 640 related to the image 600 to be searched for.

The image processor 430 may properly control a size of the received image 600 to be searched for (for example, control the image 600 to have resolution of 200×200) to convert the image 600 into a gray scale image. Since the gray scale image can be easily understood by those skilled in the art, detailed descriptions thereof will be omitted.

The image processor 430 may perform a sobel operation on the image converted into the gray scale image (i.e., the converted gray scale image) to detect an edge of an object included in the converted gray scale image. The image processor 430 may perform an operation on each of the gradient vector on an x axis and a y axis of the converted gray scale image through the sobel operation. The gradient vector on the x axis and the gradient vector on the y axis may be expressed by Equation (1) and Equation (2) below.

$$I_{(x)} = \frac{\partial f(x, y)}{\partial x} = f(x+1, y) - f(x, y) \quad (1)$$

$$I_{(y)} = \frac{\partial f(x, y)}{\partial y} = f(x, y+1) - f(x, y) \quad (2)$$

The sobel operation may correspond to one method of detecting the edge of the image. In some embodiments of the present invention, the sobel operation may be referred to as various other terms such as a sobel mask and a sobel edge detection.

The image processor 430 may calculate vector magnitudes of the gradient vectors operated through Equations (1)

and (2) above. The vector magnitudes (M(x,y)) may be calculated through Equation (3) below.

$$M(x,y) \approx |I_{(x)}| + |I_{(y)}| \approx \sqrt{I_{(x)}^2 + I_{(y)}^2} \qquad (3)$$

The image processor 430 may calculate the vector magnitudes and filter pixels included in the converted gray scale image based on the calculated vector magnitudes. That is, the image processor 430 may remove pixels having a vector magnitude smaller than a preset value (for example, when the vector magnitude is smaller than 20% of a maximum value of the calculated vector magnitudes). That is, the removed pixel is not considered when the shape of the edge of the converted gray scale image is determined. Since unnecessary pixels can be excluded through the filter operation according to an embodiment of the present invention when the shape of the converted gray scale image is determined, data throughput and a memory occupancy rate can be reduced. The image processor 430 may calculate angles of the filtered pixels through an arc tangent operation on I(x) and I(y) of the filtered pixels after the filter operation. The calculated angles may be stored in, for example, the storage unit 175.

The image processor 430 may calculate parameters mPb(x) and mPb(y) with respect to the converted gray scale image. The calculation of mPb(x) and mPb(y) by the image processor 430 may be performed separately from the sobel operation of the converted gray scale image. The image processor 430 may perform a convolution operation on the filtered pixels and the calculated mPb(x) and mPb(y). An equation related to the convolution operation is expressed below in Equation (4).

$$\text{convolution} = (mPb(x)*I(x))*(mPb(y)*I(y)) \qquad (4)$$

mPb(x) and mPb(y) correspond to parameters for calculating the shape of the edge of the converted gray scale image by performing the convolution operation based on Equation (4) above. The description of mPb(x) and mPb(y) may refer to the research articles of D. Martin, C. Fowlkes, D. Tal, and J. Malik entitled "A Database of Human Segmented Natural Images and its Application to Evaluating Segmentation Algorithms and Measuring Ecological Statistics, ICCV, 2001," and Pablo Arbelaez, Michael Maire, Charless Fowlkes, and Jitendra entitled "Contour Detection and Hierarchical Image Segmentation, EECS, 2010", which are incorporated herein their entirety by reference. The image processor 430 may determine the edge shape of the converted gray scale image and pixels included in the edge shape of the converted gray scale image based on the calculated convolution value according to Equation (4) above.

The image processor 430 quantizes the pixels included in the edge shape based on angles corresponding to the pixels included in the edge shape, which are acquired through the arc tangent operation. The image processor 430 may perform the quantization based on reference gradient values in a mapping table as shown in Table 1 below.

TABLE 1

| Reference gradient value | Angle (θ) of pixel included in edge shape |
|---|---|
| 1 | −15° ≤ θ < 15° |
| 2 | 15° ≤ θ < 45° |
| 3 | 45° ≤ θ < 75° |
| 4 | 75° ≤ θ < 105° |
| 5 | 105° ≤ θ < 135° |
| 6 | 135° ≤ θ < 165° |

The image processor 430 performs the quantization based on reference gradient values having a predetermined angle range (for example, 30° corresponding to reference gradient value 1 in Table 1). When angles of the pixels are included in a range of errors which may be generated during a process of receiving an image (for example, errors which may be generated due to an external factor such as user's hand shaking during the process of receiving the image), the image processor 430 may perform the quantization such that the angles of the pixels are included the corresponding reference gradient values. For the quantization operation, the pixels included in the edge shape acquired through the convolution operation may be grouped or re-filtered. The shape of the image may be determined by only a minimum number of pixels for determining (identifying) the shape of the image. Accordingly, it is possible to reliably and rapidly determine and search for the shape of the image with a small memory capacity.

Further, when the pixels are located on the same line of the same plane but only directions of angles thereof are different like the case of 180° and 0° (such as being symmetric with respect to a line), the image processor 430 may consider that the angles correspond to the same reference gradient value. That is, the image processor 430 may perform the quantization without considering directivity of I(x) and I(y) determined according to the angles. According to the above quantization, when the image shape is determined and related information is searched for, data throughput and a memory occupancy rate can be reduced.

However, Table 1 described above is only an example for describing the present invention, and the embodiment of the quantization of the present invention is not limited thereto. For example, the reference gradient values are classified into six values in Table 1, but the number of reference gradient values may be larger or smaller. Further, angle ranges described in Table 1 may be changed to various other ranges according to an embodiment of the present invention.

The image search unit 440 may search for information related to the image according to the determined edge shape. For example, the image search unit 440 may be connected to the server 300 through the network 200, so as to search for images 610, 620, 630, and 640 related to objects having shapes same as or similar to the shape of the image 600 to be searched for and pieces of information 611, 621, 631, and 641 related to the objects and provide the found images and information to the user. When the image searching apparatus 400 according to an embodiment of the present invention is included in the electronic device 100, the image search unit 440 may search for a predetermined image stored in the storage unit 175 of the electronic device 100. In some embodiment of the present invention, the image search unit 440 may search for images stored in another electronic device through the above described P2P scheme. The image search unit 440 may compare the determined edge shape with shapes of the objects included in images stored in at least one of a database of the server 300, the storage unit 175 of the electronic device, and a storage unit of another electronic device to determine the images 610, 620, 630, and 640 which are associated with the image 600 to be searched for. Further, the image search unit 440 may search for the images 610, 620, 630, and 640 and the pieces of information 611, 621, 631, and 641. The display unit 450 may display the images 610, 620, 630, and 640 and the pieces of information 611, 621, 631, and 641 related to the images 610, 620, 630, and 640 as illustrated in FIG. 12.

Function(s) or operation(s) performed by the display unit 450 according to an embodiment of the present invention may be performed by, for example, the touch screen 190. Function(s) or operation(s) performed by the image search unit 440 and the image receiver 420 may be performed by, for example, the sub-communication module 130 and/or the controller 110. Further, Function(s) or operation(s) performed by the user authentication unit 410 and the image processor 430 may be performed by, for example, the controller 110.

Figure 7:
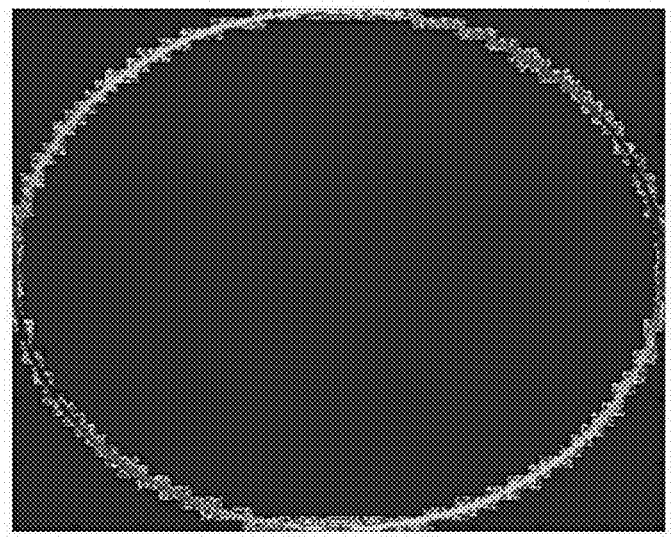
FIG. 7 illustrates an edge image when filtering and convolution operations are not performed according to an embodiment of the present invention.
Figure 9:
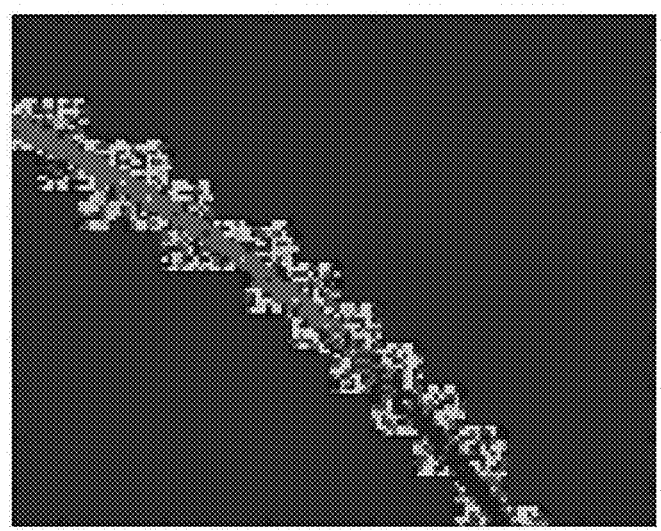
FIG. 9 illustrates an enlarged part from an edge quantized image illustrated in FIG. 7.

FIG. 7 illustrates an edge image when filtering and convolution operations are not performed according to an embodiment of the present invention, and FIG. 9 illustrates an enlarged part from the edge image illustrated in FIG. 7.

As illustrated in FIGS. 7 and 9, it is noted that the edge image in which the convolution operation is not performed includes a plurality of pixels which are not required for determining the shape of the image 600 to be searched for.

Figure 8:
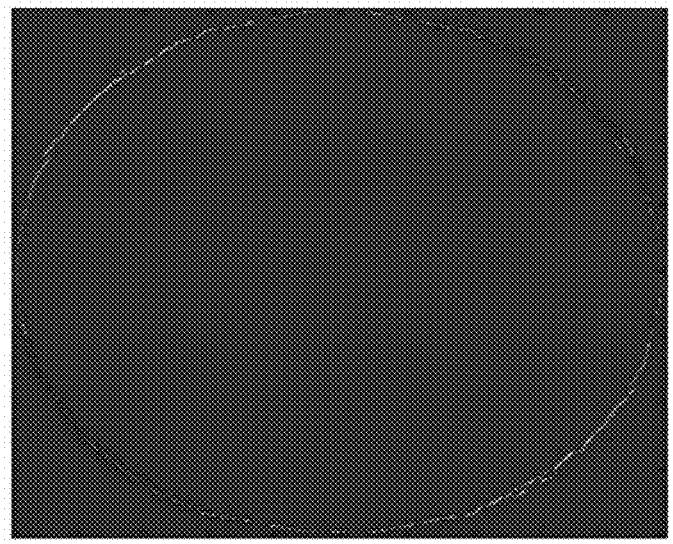
FIG. 8 illustrates an edge image when filtering and convolution operations are performed according to an embodiment of the present invention.
Figure 10:
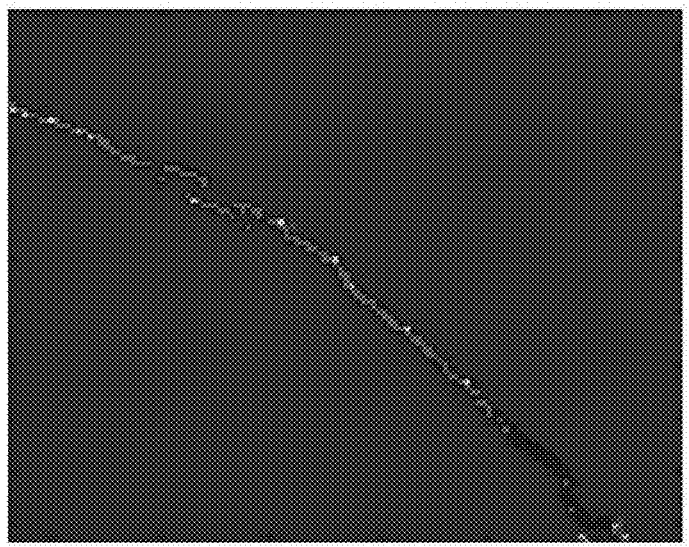
FIG. 10 illustrates an enlarged part from an edge quantized image illustrated in FIG. 8.

FIG. 8 illustrates an edge image when filtering and convolution operations are performed according to an embodiment of the present invention, and FIG. 10 illustrates an enlarged part from the edge image illustrated in FIG. 8.

Referring to FIGS. 8 and 10, it is noted that the edge image in which the convolution operation is performed includes only pixels which are required for identifying the edge shape of the image 600 to be searched for. As described above, the image searching apparatus 400 according to an embodiment of the present invention may sequentially perform the filtering, the quantization processing, and the convolution operation, thereby reducing the complexity of the quantized image for the edge of the image 600 to be searched for. Accordingly, when the image is searched for by the image searching apparatus 400 according to an embodiment of the present invention, the number of comparisons between edges of the image 600 to be searched for and the found information (for example, the images 610, 620, 630, and 640 related to objects having shapes same as or similar to the image to be searched for) can be reduced. As a result, information associated with the image 600 to be searched for can be effectively found while maintaining small data throughput and a small memory occupancy rate.

Figure 6:
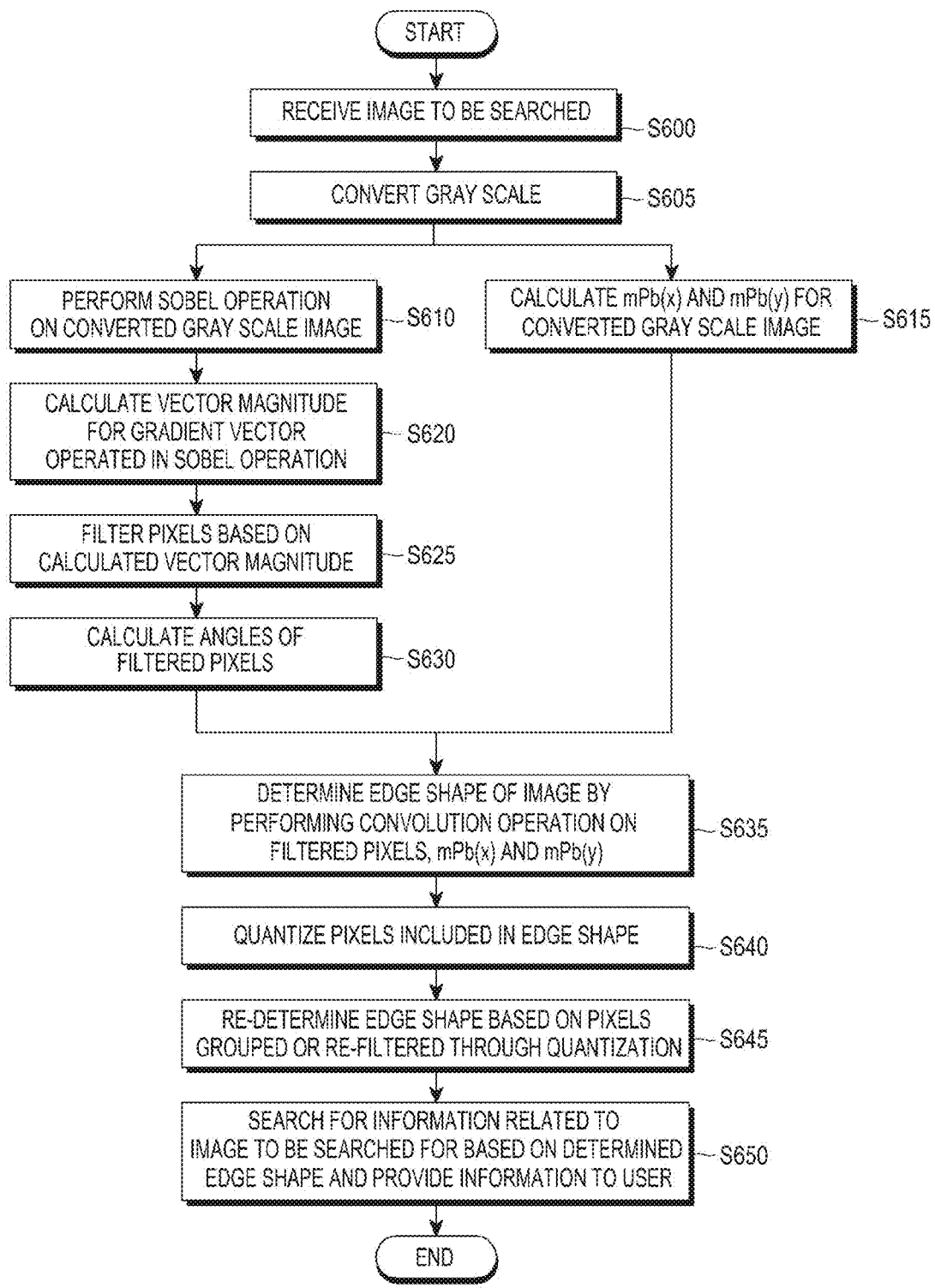
FIG. 6 is a flowchart illustrating an image search method according to an embodiment of the present invention.

FIG. 6 is a flowchart illustrating an image searching method performed by the image searching apparatus according to an embodiment of the present invention.

Referring to FIG. 6, in the image searching method according to an embodiment of the present invention, the image searching apparatus 400 receives the image 600 to be searched for from the user in step S600 and converts the received image into a gray scale image in step S605.

Subsequently, the image searching apparatus 400 performs a sobel operation on the converted gray scale image to detect an edge of the converted gray scale image and calculates parameters mPb(x) and mPb(y) in steps S610 and S615, respectively.

The image searching apparatus 400 calculates vector magnitudes of gradient vectors calculated in the sobel operation in step S620 and performs filtering on pixels based on the calculated vector magnitudes in step S625.

The image searching apparatus 400 calculates angles of the filtered pixels and stores data related to the calculated angles in step S630. The image searching apparatus 400 performs a convolution operation on the filtered pixels and mPb(x) and mPb(y), and determines the edge shape of the converted gray scale image based on the operated convolution value in step S635. The image searching apparatus 400 performs the above described quantization on the determined edge shape in step S640, and re-determines the edge shape of the converted gray scale image based pixels grouped or re-filtered through the quantization to finally decide the re-determined edge shape as the edge shape in step S645.

The image searching apparatus 400 searches for information related to the image to be searched for based on the determined edge shape and provide the information to the user in step S650.

Although steps S610-S650 are illustrated to be performed based on the converted gray scale image of step S605, these steps may be performed based on the received image of step S600 without step 605.

Although not illustrated in FIG. 6, the image searching method according to an embodiment of the present invention may include an operation of performing a user authentication based on user information received from the user. The user authentication may be for determining whether the user is an authorized user who can use an image searching service as described above.

In addition, since the descriptions of the image searching apparatus 400 according to an embodiment of the present invention may be similarly applied to the image searching method according to an embodiment of the present invention, detailed descriptions thereof will be omitted.

FIGS. 11A to 11D illustrate an example of an operation in which an image searching apparatus according to an embodiment of the present invention detects an edge of an image to be searched for in order to search for the image.

Figure 11A:
FIGS. 11A to 11D illustrate an example of an operation in which an image searching apparatus according to an embodiment of the present invention detects an edge of an image to be searched for in order to search for the image.
Figure 11B:
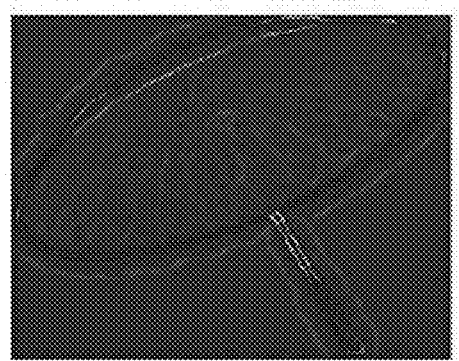
Figure 11C:
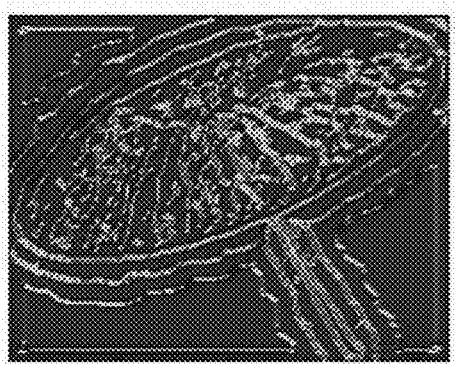
Figure 11D:
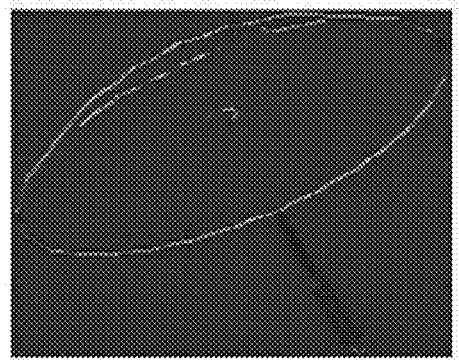

Referring to FIGS. 11A to 11D, FIG. 11A illustrates an image to be searched for, and FIG. 11B illustrates a result of detecting an edge shape of the object included in the image to be searched for based on mPb(x) and mPb(y) from the image to be searched for illustrated in FIG. 11A. FIG. 11C illustrates a result of performing quantization on the shape illustrated in FIG. 11B. FIG. 11D illustrates a result of detecting an edge shape of the image to be searched for illustrated in FIG. 11A by performing a convolution operation based on equation (4).

Through a comparison between the edge shape (FIG. 11D) which is detected by the image searching apparatus according to an embodiment of the present invention and the edge shapes (FIGS. 11B and 11C) which is detected according to the prior art, it is noted that the present invention can express all characteristic shapes of the object included in the image to be searched for by a smaller number of pixels compared to the prior art. Accordingly, when information related to the image to be searched for is searched for, the information can be effectively searched for while maintaining small data throughput and memory occupancy.

FIG. 12 illustrates an example in which an image searching method according to an embodiment of the present invention is performed by an electronic device.

Referring to FIG. 12, the user may input the image 600 to be searched for, using an input means (for example, a stylus pen). The electronic device 100 according to an embodiment of the present invention may display the images 610, 620, 630, and 640 having same or similar shapes of objects to that of the image 600 to be searched for and pieces of information 611, 621, 631, and 641 related to the images 610, 620, 630, and 640, as the information related to the image 600 to be searched for. Information related to the images 610, 620, 630, and 640 may be, for example, a webpage address including the description of the found images 610, 620, 630, and 640, but the present invention is not limited thereto. Although FIG. 12 illustrates the four found images 610, 620, 630, and 640, the present invention is not limited thereto.

According to the present invention, since an image can be intuitively searched for based on an image such as a sketch image or a scan image requested to be searched for by a user, user convenience can be improved through a rapid image search.

According to the present invention, the number of comparisons between an image to be searched for and the found images can be reduced by filtering pixels on an edge of the image to be searched for, and thus, the image search can be reliably and rapidly performed with the small memory capacity occupancy.

While the embodiment of the present invention has been described with reference to the accompanying drawings, it will be understood by those skilled in the art that the present invention may be varied and modified without departing from the scope and technical spirit and the essential feature of the present invention as defined by the appended claims and their equivalents. Accordingly, it should be understood that the disclosed embodiments are merely examples and are not intended to limit the present invention.

What is claimed is:

1. An apparatus for searching for an image, the apparatus comprising:
   a processor configured to:
   receive an image to be searched for;
   detect an edge of the received image;
   filter pixels included in the edge of the received image based on parameters related to gradients of the edge of the received image; and
   simultaneously search for one or more images of at least one object having a shape corresponding to a shape of the filtered pixels included in the edge of the received image and pieces of information related to the at least one object.

2. The apparatus of claim 1, wherein the processor is further configured to perform a convolution operation on a plurality of pixels included in the filtered pixels on the edge of the received image and parameters for determining the shape of the edge of the received image.

3. The apparatus of claim 2, wherein the processor is further configured to perform quantization on pixels included in the shape of the edge of the received image determined through the convolution operation.

4. The apparatus of claim 1, wherein the processor is further configured to convert the received image into a gray scale image.

5. The apparatus of claim 4, wherein the processor is further configured to detect an edge of an object included in the converted gray scale image.

6. The apparatus of claim 5, wherein the parameters related to the gradients of the edge of the received image correspond to vector magnitudes for directivities of gradients of the detected edge of the object included in the converted gray scale image.

7. The apparatus of claim 6, wherein the processor is further configured to filter pixels having the vector magnitudes less than or equal to a predetermined value by removing the pixels.

8. The apparatus of claim 1, wherein the processor is further configured to receive user authentication information and to perform user authentication based on the received user authentication information.

9. A method of searching for an image, the method comprising:
   receiving an image to be searched for;
   detecting an edge of the received image;
   filtering pixels included in the edge of the received image based on parameters related to gradients of the edge of the received image; and
   simultaneously searching for one or more images of at least one object having a shape corresponding to a shape of the filtered pixels included in the edge of the received image and pieces of information related to the at least one object.

10. The method of claim 9, further comprising performing a convolution operation on a plurality of pixels included in the filtered pixels included in the edge of the received image and parameters for determining the shape of the edge of the received image.

11. The method of claim 10, further comprising performing quantization on pixels included in the shape of the edge of the received image determined through the convolution operation.

12. The method of claim 9, further comprising converting the received image into a gray scale image.

13. The method of claim 12, further comprising detecting an edge of an object included in the converted gray scale image.

14. The method of claim 13, further comprising determining vector magnitudes for directivities of gradients of the detected edge of the object included in the converted gray scale image.

15. The method of claim 14, wherein filtering the pixels included in the edge of the received image comprises filtering pixels included in the edge of the object included in the converted gray scale image by removing the pixels having the vector magnitudes less than or equal to a predetermined value.

16. The method of claim 9, further comprising receiving user authentication information and performing user authentication based on the received user authentication information.

* * * * *